United States Patent [19]
Schattschneider et al.

[11] Patent Number: 4,574,356
[45] Date of Patent: Mar. 4, 1986

[54] PEAK DYNAMIC STRESS CALCULATOR

[75] Inventors: George K. Schattschneider, Victoria; James R. Matthews, Lower Sackville, both of Canada

[73] Assignee: Minister of National Defence of Her Majesty's Canadian Government, Ottawa, Canada

[21] Appl. No.: 468,627

[22] Filed: Feb. 22, 1983

[30] Foreign Application Priority Data

Feb. 11, 1982 [CA] Canada .................................. 468627

[51] Int. Cl.$^4$ ............................................... G01B 7/16
[52] U.S. Cl. ........................................ 364/508; 73/767
[58] Field of Search ................. 364/508; 73/760, 767, 73/770, 775, 794, 784, 862.04

[56] References Cited

U.S. PATENT DOCUMENTS

| | | | |
|---|---|---|---|
| 2,447,517 | 8/1948 | Manson | 364/508 |
| 3,435,669 | 4/1969 | Slavov et al. | 364/508 |
| 3,474,237 | 10/1969 | Hastings | 364/508 |
| 3,680,365 | 8/1972 | Summers | 73/780 X |
| 3,755,658 | 8/1973 | Walters | 364/508 |
| 4,336,595 | 6/1982 | Adams et al. | 364/508 |
| 4,461,182 | 7/1984 | Jones, Jr. et al. | 73/770 X |

OTHER PUBLICATIONS

*The Strain Gage Primer*, C. C. Perry & H. R. Lissner, 1962, McGraw Hill, Chapter 7, pp. 136-137.

Nat. Elec. Conf., Apr. 1951 (vol. 6), "Rosette Principal Strain Computer", C. M. Hathaway et al., pp. 295-307.

*Primary Examiner*—Errol A. Krass
*Assistant Examiner*—Kevin J. Teska
*Attorney, Agent, or Firm*—Saul Elbaum; Thomas E. McDonald; Anthony T. Lane

[57] ABSTRACT

An apparatus for automatically determining various stresses measured by a rectangular strain gage rosette. The apparatus receives signals from the rosette and provides signals representative of the maximum principal stress, the minimum principal stress and the maximum shear stress, the peak maximum principal stress, the minimum principal stress at the instant when the maximum principal stress is peaking, and the peak value of the shear stress. A first analog signal processor provides stress signals representative of the maximum principal stress, minimum principal stress and maximum shear stress for each instantaneous input signal amplitude from each arm of the strain gauge rosette, and a second signal processor receives the stress signals and provides output signals representative of the peak maximum principal stress, minimum principal stress at the instant of peak maximum principal stress, and peak maximum shear stress. Using the apparatus a designer of a vehicle or other apparatus normally subject to stress can observe the aforenoted stresses immediately during a test and either repeat the test of very slightly alter it to affirm the data or to detect subtle differences.

7 Claims, 4 Drawing Figures

PEAK DYNAMIC STRESS CALCULATOR

BACKGROUND OF THE INVENTION

This application corresponds to Canadian Pat. No. 1,165,880, entitled "Peak Dynamic Stress Calculator", issued Apr. 17, 1984 to the inventors named herein.

FIELD OF THE INVENTION

This invention relates to apparatus for automatically determining the principal stresses and maximum shear stress from one or a plurality of rectangular strain gauge rosettes during real time.

DESCRIPTION OF RELATED ART

The design of equipment such as vehicles which undergo various degrees of stress depends to a great extent on stress testing. This is usually undertaken using measurements from strain gauges placed at various stress points on the vehicle or apparatus undergoing test.

It is often desirable to determine the maximum principal stress, the minimum principal stress and the maximum shear stress, as well the peak maximum principal stress, the minimum principal stress at the instant when the maximum principal stress is peaking, and the peak value of the maximum shear stress. When little is known about a stress field or its direction at a particular test point, it is necessary to employ a three element strain gauge rosette to enable determination of the previously mentioned values. The determination of these values from the outputs of the strain gauges is complex, and heretofore could not be measured directly to obtain real time observation of the relative stresses.

Real time observation of the aforenoted stresses is important, since, for example, when a vehicle is being tested, a certain mode of operation which causes a particular peak stress to be observed can be immediately repeated or varied slightly and the results observed. Previously, the determination of peak maximum principal stress, minimum principal stress at the instant when the maximum principal stress is peaking, and the value of the peak maximum shear stress was obtained either by recording the output signals from the strain gauges, and then either hand calculating the stresses, or by applying the recorded strain gauge rosette output data to digital computers. In both cases there is a significant time lag during which the exact physical external factors which are to be repeated can be, and often are lost.

SUMMARY OF THE INVENTION

The present invention is a circuit which provides, on a real time basis, signals representing the maximum principal stress, the minimum principal stress, the maximum shear stress, the peak value of the maximum principal stress, the value of minimum principal stress at the instant when the maximum principal stress is peaking, and the peak value of the maximum shear stress. These signals can be displayed on an alphanumeric display, which allows the operator of the apparatus which is under test to repeat certain tests with similar external factors immediately upon observation of their effect, or to make note of the external factors giving rise to the stress which would otherwise be missed with the prior art methods of hand and computer calculation a long time after the transient factors have passed.

In general, the present invention is an apparatus for the determination of stress in a structural member comprising means for receiving input signals from the arms of a rectangular strain gauge rosette attached to the member, a first analog signal processor for providing stress signals representative of the maximum principal stress, minimum principal stress, and maximum shear stress for each instantaneous input signal amplitude continuously upon receipt of the input signals, and a second signal processor for receiving the stress signals and for providing output signals representative of maximum peak principal stress, minimum principal stress at the instant of peak maximum principal stress, and peak maximum shear stress.

A number of such circuits can be connected in parallel to a channel selector to provide a plurality of input channels. A group of digital panel meters can be switched to receive signals from any of the channels as desired. Of course a printer can also be used to record the output signals of each of the channels continuously.

BRIEF DESCRIPTION OF THE DRAWINGS

A better understanding of the invention will be obtained by reference to the detailed description below, in conjunction with the following figures, in which.

DESCRIPTION OF PREFERRED EMBODIMENTS

Figure 1:
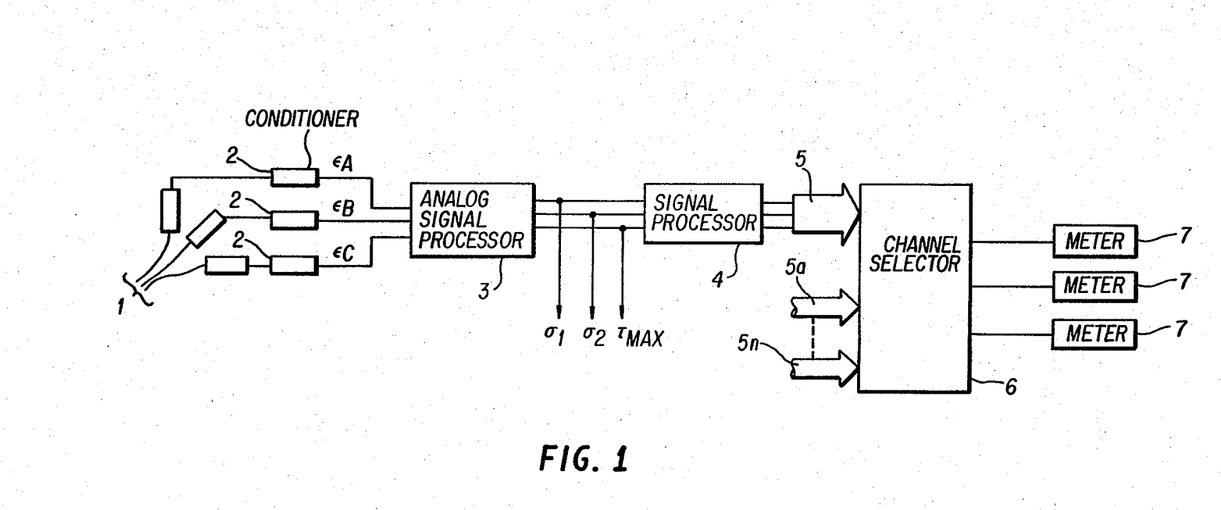
FIG. 1 is a basic block schematic of the invention.

Turning to FIG. 1, strain gauges disposed in the usual form at 45° to the other, forming a three element rectangular strain gauge rosette 1 are connected to corresponding strain gauge conditioners 2. The strain gauge conditioners are of conventional construction, and provide output signals $\epsilon_A$, $\epsilon_B$, and $\epsilon_C$ which signals are directly related to the amount of strain each corresponding arm of the rosette undergoes. In use the strain gauge rosette is attached to a structural member of an apparatus under test.

The aforenoted output signals from the strain gauge conditioners are applied to a first analog signal processor 3. This processor contains circuitry which provide output signals $\sigma_1$ representative of the instantaneous maximum principal stress, $\sigma_2$ representative of the minimum principal stress, and $\tau_{max}$, the maximum shear stress. The analog signal processor translates the output signals from the strain gauge conditioners by circuitry which has the following transfer functions:

$$\sigma_1 = E\left[\frac{\epsilon_A + \epsilon_C}{2(1-\nu)} + \frac{1}{2(1+\nu)}\sqrt{(\epsilon_A - \epsilon_C)^2 + (2\epsilon_B - \epsilon_A - \epsilon_C)^2}\right] \quad (1)$$

$$\sigma_2 = E\left[\frac{\epsilon_A + \epsilon_C}{2(1-\nu)} - \frac{1}{2(1+\nu)}\sqrt{(\epsilon_A - \epsilon_C)^2 + (2\epsilon_B - \epsilon_A - \epsilon_C)^2}\right] \quad (2)$$

$$\tau_{MAX} = \frac{\sigma_1 - \sigma_2}{2} = \quad (3)$$

$$\frac{E}{2(1-\nu)}\sqrt{(\epsilon_A - \epsilon_C)^2 + (2\epsilon_B - \epsilon_A - \epsilon_C)^2}$$

where
 $\nu$ is approximately 0.3 for steel,
 E is approximately $3 \times 10^7$ for steel, and
 $\epsilon_A$, $\epsilon_B$ and $\epsilon_C$ are the conditioned output signals of the 0°, 45° and 90° oriented arms of the strain gauge rosette. The values $\nu$ and $\epsilon$ given above are also a fairly good approximation for most metals.

Equation (1) can be expressed as follows:

$$\sigma_1 = E(.714(\epsilon_A + \epsilon_C) + \sqrt{[.385(\epsilon_A - \epsilon_C)]^2 + [.385(2\epsilon_B - \epsilon_A - \epsilon_C)]^2}\,)$$

and equation (2) can be similarly expressed, but with the second "+" sign replaced by a "−" sign.

Analog signal processor 3 thus produces three output signals, respectively corresponding to the maximum principal stress, the minimum principal stress and the maximum shear stress, on an instantaneous real time basis. These signals can be recorded (chart recorder or magnetic tape recorder) or applied to readout devices such as panel meters or the like for use by the operator.

The signals are applied to a second signal processor 4. This processor has a transfer function which provides output signals determinative of the peak principal stress values, and detects, captures and holds signals representing the peak value of the maximum principal stress, the value of the maximum principal stress at the instant of the peak maximum principal stress, and the peak value of the maximum shear stress. The aforenoted peak value signals are stored, but the second signal processor 4 can be reset to zero whenever desired.

The peak value signals noted above can then be routed to panel meters or, if desired, can be routed via bus 5 to a channel selector 6, with similar buses 5a–5n from other signal processing equipment connected to other strain gauge rosettes. In one useful configuration, for instance, there could be six strain gauge rosettes resulting in six buses connected to channel selector 6. Three digital panel meters 7 can be switched to any one channel to read the three peak value signals described above. The signals $\sigma_1$, $\sigma_2$ and $\tau_{max}$ could also be connected through a channel selector to a group of panel meters, or, if desired, each could have its own readout display. Further, each bus 5a–5n can be connected to a data logger which records permanently the peak value signals which have been obtained.

Figure 2:
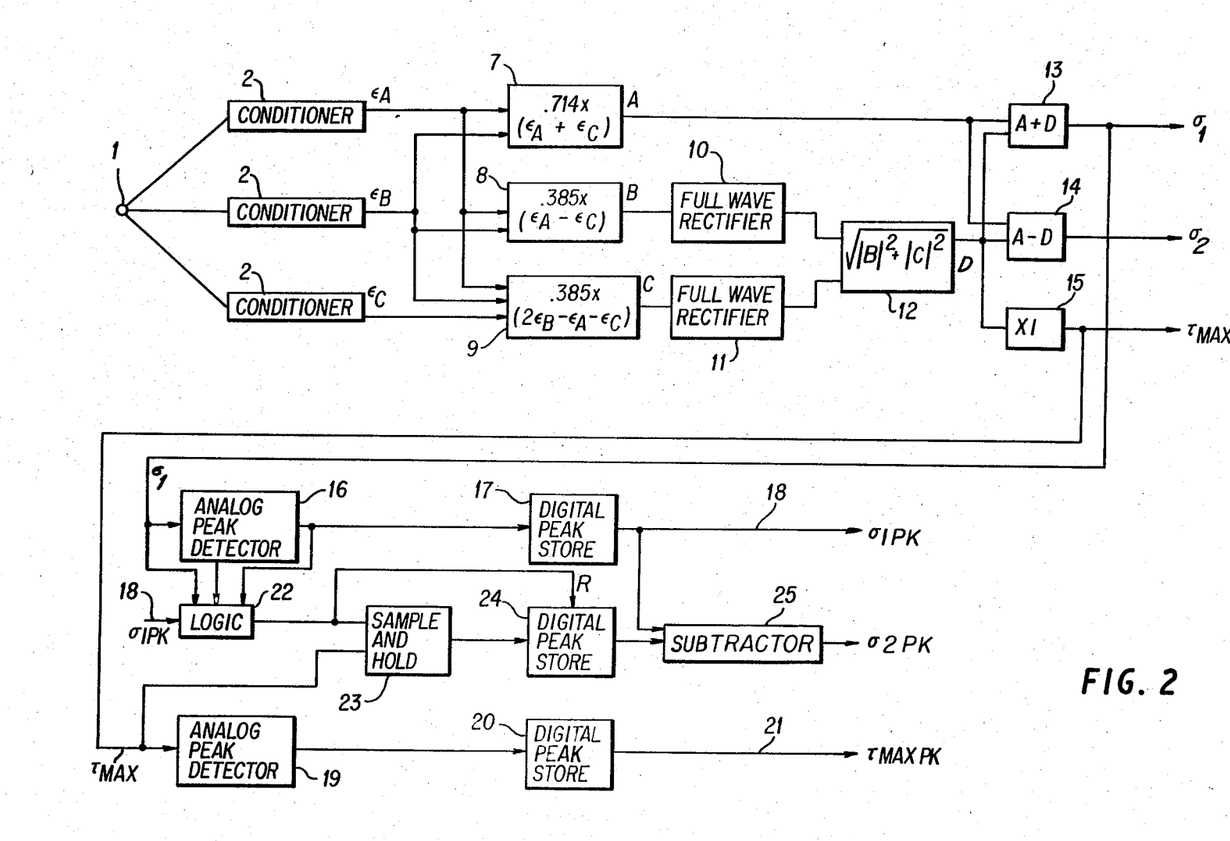
FIG. 2 is a detailed block diagram of the invention.

In FIG. 2, showing more detail of the invention, a strain gauge rosette 1 is connected to conditioners 2, as in FIG. 1. The outputs of the conditioners are $\epsilon_A$, $\epsilon_B$ and $\epsilon_C$ respectively. Signals $\epsilon_A$ and $\delta_C$ are applied to a circuit which adds them together and multiples the sum by a factor 0.714, to produce a signal A. Similarly the signals $\epsilon_A$ and $\epsilon_C$ are applied to a circuit which subtracts the signal $\epsilon_C$ from $\epsilon_A$ and multiplies the difference by a factor 0.385, to produce a signal B. All three signals $\epsilon_A$, $\epsilon_B$ and $\epsilon_C$ are connected to a third circuit 9 which multiples the signal $\epsilon_B$ by 2 and subtracts the signals $\epsilon_A$ and $\epsilon_C$ therefrom, multiplying the result by 0.385, to produce the signal C.

The signals B and C are applied individually to full wave rectifiers 10 and 11, to produce the signals |B| and |C| respectively. These signals are applied to a circuit 12 which squares each of signals |B| and |C|, adds the squares together, and takes the square root of the sum, to produce the signal D.

The signals A and D are applied to an adding circuit 13, which adds the two signals together to produce the signal $\sigma_1$, which is representative of the maximum principal stress. The signals A and D are also applied to a subtracting circuit 14 which substracts the signal D from the signal A, and produces the resulting signal $\sigma_2$, which is representative of the minimum principal stress. The signal D is passed through a buffer 15, which provides at its output a signal $\tau_{max}$ which is representative of the maximum shear stress encountered by the strain gauge rosette.

The three stress signals thus obtained provide a real time determination of the instantaneous maximum principal stress, minimum principal stress, and maximum shear stress, and can be displayed directly on appropriately calibrated analog or digital panel meters or recorded using a chart recorder or magnetic tape recorder.

The signals are also applied to a peak determination and holding circuit as will be described below.

The maximum principal stress signal $\sigma_1$ is applied to an analog peak detector 16. The output of this detector circuit is applied to a digital peak store (memory) 17, which provides an output signal on lead 18 which is representative of the peak principal stress.

Similarly, the maximum shear stress signal $\tau_{max}$ is applied to an analog peak detector 19, which has its output connected to a digital peak store (memory) 20, the output signal of which, on lead 21, is representative of the peak value of the maximum shear stress.

The remaining circuitry provides a signal indicative of the minimum principal stress at the instant when the maximum principal stress is peaking.

Both the peak maximum principal stress signal on lead 18 and the maximum principal stress signal are applied to a logic circuit 22, with two signals to be described later from the interior and the output of the analog peak detector 16. The output of logic circuit 22 is a control signal which is high (or "on") when both the instantaneous maximum principal stress is greater than the digitally stored peak maximum principal stress, and a new analog peak is being detected. The control signal is applied to sample and hold circuit 23 with the maximum shear stress signal, the output of which is applied to digital peak store (memory) 24. The output of logic circuit 22 is also applied to the reset input R of digital peak store 24.

The output of digital peak store 24 is connected to the input of a subtracting circuit 25 with the output of digital peak store 17. This circuit multiplies the output of digital peak store 24 by a factor of 2, and subtracts the product from the signal at the output of digital peak store 17, to provide an output signal on lead 26 which is representative of the minimum principal stress at the instant when the maximum principal stress is at its peak.

In operation, it will be noted that the maximum principal stress and maximum shear stress signals are applied to analog peak detectors 16 and 19 respectively, which retain signals representative of the peak voltage detected and apply these signals to digital peak stores 17 and 20. The output signals, on leads 18 and 21 respectively, are representative of the peak value of the maximum principal stress and the peak value of the maximum shear stress undergone by the strain gauge rosette.

Logic circuit 22 provides an output signal which has either of two states, high or low. When the instantaneous maximum principal stress signal is less than its previous peak, the output of logic circuit 22 is low or "off. However, when the input signal is of greater amplitude than its previous peak, the output goes high, or "on", the signal sampled in sample and hold circuit 23, and digital peak store 24, which is reset to zero. Immediately after the new input signal peak has passed, the output of logic circuit 22 goes low, the signal at sample and hold circuit 23 is held, and digital peak store 24 digitally stores the new signal value. The output of digital peak store 24 is applied to subtractor 25, where the minimum principal stress is derived. The resulting output signal is representative of the minimum principal stress at the instant of peak maximum principal stress.

Figure 3:
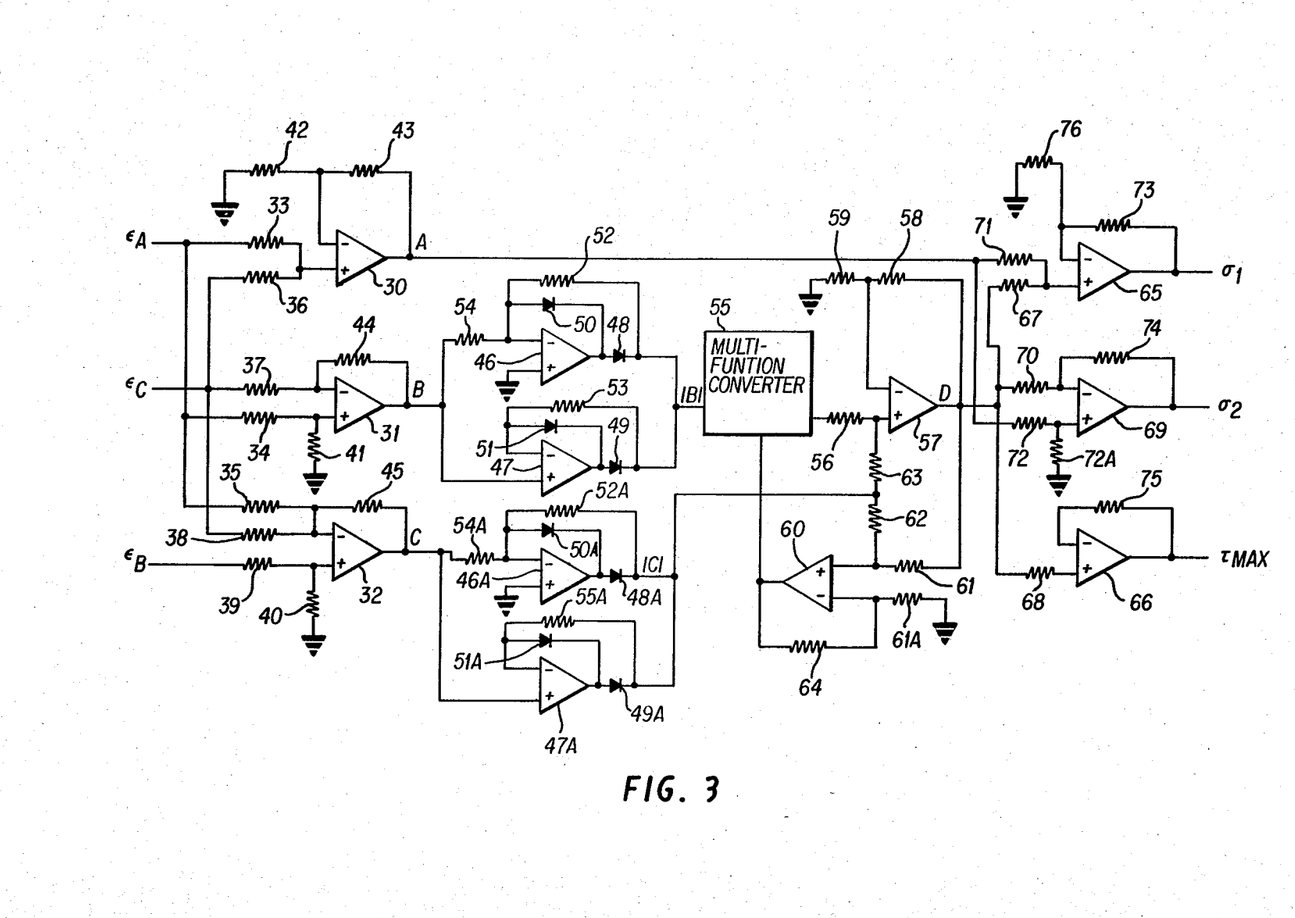
FIG. 3 is a schematic diagram illustrative of a first signal processor portion of the invention.

Turning now to FIG. 3, the first signal processor portion is shown. The output signals from the signal conditioners connected to each section of the strain gauge rosette, that is, signals $\epsilon_A$, $\epsilon_C$ and $\epsilon_B$, are applied to the inputs of operational amplifiers 30, 31 and 32. Signal $\epsilon_A$ is applied to the non-inverting inputs of amplifiers 30 and 31 through resistors 33 and 34 respectively, and to the inverting input of amplifier 32 through resistor 35. Signal $\epsilon_C$ is applied to the non-inverting input of operational amplifier 30 through resistor 36, to the inverting input of amplifier 31 through resistor 37, and to the inverting input of amplifier 32 through resistor 38. Signal input $\epsilon_B$ is applied to the non-inverting input of amplifier 32 through resistor 39, that input also being connected to ground through resistor 40. The non-inverting input of amplifier 31 is connected to ground through resistor 41, and the inverting input of amplifier 30 is connected to ground through resistor 42. A feedback resistor 43 connects the output of amplifier 30 to its non-inverting input, a resistor 44 connects the output of amplifier 31 to its non-inverting input, and the output of amplifier 32 is connected to its non-inverting input through resistor 45.

The outputs of amplifiers 31 and 32 are connected to similar circuits. The circuit connected to the output of amplifier 31 is comprised of a pair of operational amplifiers 46 and 47 having their outputs connected together through diodes 48 and 49, the anodes of the diodes being connected respectively to the outputs of the amplifiers 46 and 47. Their inverting inputs are connected to their outputs through corresponding diodes 50 and 51, and also to the junction of the cathodes of diodes 48 and 49 through resistors 52 and 53. The inverting input of amplifier 46 is connected to the output of amplifier 31 through resistor 54, and the non-inverting input of amplifier 47 is connected to the output of amplifier 31.

The circuit connected to the output of amplifier 32 is similar to that described above, having similar components labelled with similar numerals suffixed with the letter "A".

The cathodes of diodes 48 and 49 are connected to the input of a multifunction converter 55, which has its output terminal connected through resistor 56 to the non-inverting input of operational amplifier 57. Operational amplifier 57 has its output connected to its inverting input through resistor 58, the inverting input also being connected to ground through resistor 59. The output of amplifier 57 is connected to the non-inverting input of amplifier 60 through resistor 61, which input is also connected to the non-inverting input of amplifier 57 through a pair of resistors 62 and 63. The cathodes of diodes 48A and 49A are connected to the junction of resistors 62 and 63, and the output of amplifier 60 is connected to the its non-inverting input through resistor 64.

The output of amplifier 57 is connected to the non-inverting inputs of operational amplifier 65 and 66 through resistors 67 and 68, and to the inverting input of operational amplifier 69 through resistor 70. The output of operational amplifier 30 is connected to the non-inverting inputs of amplifiers 65 and 69 through resistors 71 and 72 respectively. The inverting inputs of amplifiers 65, 69 and 66 are connected to their respective outputs through resistors 73, 74 and 75. Amplifier 65 has its inverting input connected to ground through resistor 76.

The ratio of the resistors connected to operational amplifier 30 is adjusted so as to provide an amplification of 0.714. Since the input signals to amplifier 30 are $\epsilon_A$ and $\epsilon_C$, the output signal therefrom equals $0.714 \times (\epsilon_A + \epsilon_C)$. This output signal, referenced as signal A is applied to the input of operational amplifier 65.

The resistors connected to operational amplifier 31 are adjusted so as to provide an amplification of 0.385. Signal $\epsilon_C$ is applied to the inverting input of operational amplifier 31, and signal $\epsilon_A$ is applied to its non-inverting input. Consequently the output signal, reference B, of operational amplifier 31 is equal to $0.385 \times (\epsilon_A - \epsilon_C)$.

Both signals $\epsilon_A$ and $\epsilon_C$ are applied to the inverting input of operational amplifier 32, while signal $\epsilon_B$ is applied to its non-inverting input. The resistors connected to amplifier 32 should be adjusted so as to provide an amplification of 0.385, but to provide gain of twice the amount for signal $\epsilon_B$ as for signals $\epsilon_A$ and $\epsilon_C$. For example, if all of the signal-carrying resistors 34, 37, 35, 38 and 39 are 10k ohms, and resistors 44 and 45 are 3.85k ohms, resistor 41 can be 3.85k and resistor 40 can be 7.69k ohms. As a result, the output signal of amplifier 32, reference C, is equal to $0.385 \times (2\epsilon_B - \epsilon_A - \epsilon_C)$.

The circuits connected to the outputs of amplifiers 31 and 32 to the junctions of diodes 48 and 49 (and 48A and 49A) form full wave rectifiers, the output signals being referenced (B) and (C) respectively.

As mentioned earlier, circuit 55 is a multifunction converter, typically type LH0094, available from National Semiconductor. That circuit in conjunction with operational amplifiers 57 and 60 with their associated resistors (each of which can be 10k ohms) provides a transfer function as follows:

$$\sqrt{|B|^2 + |C|^2}$$

The output signal of the circuit which provides the aforenoted transfer function is referenced D.

It may be seen that the signal D is applied with signal A so as to add in operational amplifier 65, and in a direction so as to be subtracted from signal A in amplifier 69. Signal D is also applied to amplifier 66 so as merely to be buffered therethrough.

The output signal of amplifier 65 is $\sigma_1$, representative of the maximum principal stress; the output signal of amplifier 69 is $\sigma_2$ representative of the minimum principal stress, while the output signal of buffer amplifier 66, $\tau_{max}$ is representative of the maximum shear stress. These signals can be applied to a display system whereby the maximum and minimum principal stresses and maximum shear stress can be read as they are incurred.

Figure 4:
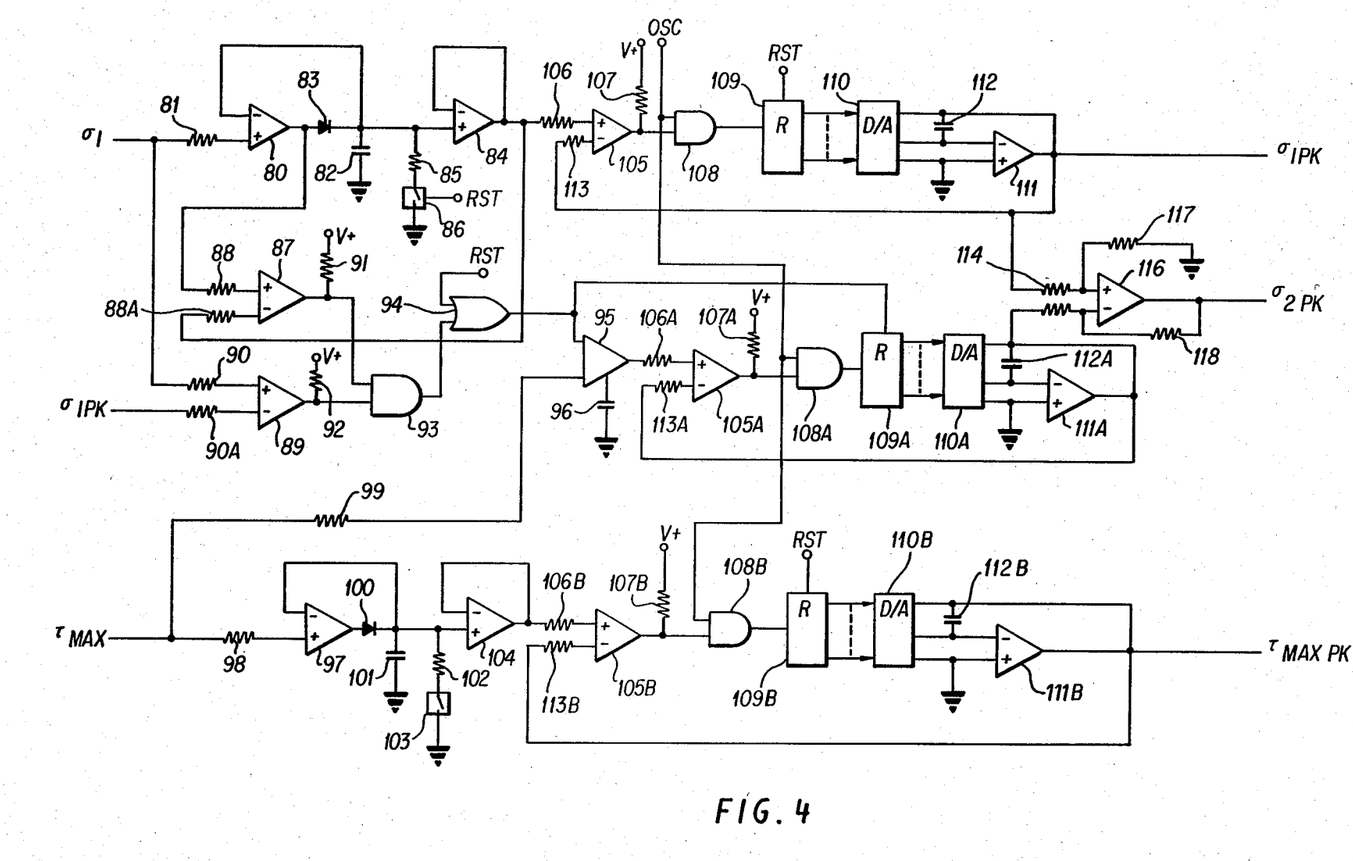
FIG. 4 is a basic schematic diagram of the preferred form of the second signal processor portion of the invention.

The maximum principal stress signal and the maximum shear stress signal are applied to the circuit shown in FIG. 4. The maximum principal stress signal is applied to the non-inverting input of operational amplifier 80 through resistor 81. The output of amplifier 80 is connected to capacitor 82 through diode 83, the junction of diode 83 and capacitor 82 being connected back to the inverting input of operational amplifier 80. This junction is also connected to the non-inverting input of amplifier 84, which has its output connected to its inverting input. Its non-inverting input is connected to ground, with capacitor 82, through the series circuit of resistor 85 and reset switch 86.

The output of amplifier 80 is connected to the non-inverting input of comparator 87, through resistor 88, the output of amplifier 84 being connected to its inverting input through resistor 88A. The maximum principal stress signal $\sigma_1$ is also applied to the non-inverting input of comparator 89 through resistor 90, its inverting input being connected to a source of the derived peak maximum principal stress signal $\theta_{1PK}$ which will be described below. The outputs of comparators 87 and 89 are connected to a source of positive potential V+ through resistors 91 and 92, and to separate inputs of AND gate 93. The output of AND gate 93 is connected to one input of OR gate 94, which has its other input connected to an external reset terminal RST. The output of OR gate 94 is connected to the control input of a sample and hold circuit 95, to which memory capacitor 96 is connected. Sample and hold circuit 95 can be type 398, while comparators 87 and 89 an be type 339.

The maximum shear stress signal $\tau_{max}$ is applied to the non-inverting input of operational amplifier 97 through resistor 98, and to the other signal of sample and hold circuit 95 through resistor 99. The output of operational amplifier 97 is connected through diode 100 to capacitor 101, the junction of diode 100 and capacitor 101 being connected back to the non-inverting input of amplifier 97. This junction is also connected through the series circuit of resistor 102 and reset switch 103 to ground, with capacitor 101. The junction is also connected to the non-inverting input of operational amplifier 104, which has its output connected to its non-inverting input.

Circuits are connected to the outputs of amplifiers 84, 95 and 104, which are all of similar construction. Only one will be described in detail, connected to amplifier 84, the circuit reference connected to operational amplifiers 95 and 104 having suffixes "A" and "B" respectively, denoting similar components.

The output of amplifier 84 is connected to the non-inverting input of comparator 105, through resistor 106. The output of amplifier 105 is connected through resistor 107 to the source of positive potential V+, and also to one input of AND gate 108. The other input of AND gate 108 is connected to a terminal to which an oscillator signal is to be applied, preferably about 100 kilohertz in frequency.

The output of AND gate 108 is connected to the input of a binary counter 109, e.g. type 4040. The parallel outputs of binary counter 109 are connected to digital-to-analog converter 110, e.g. type 1020. The reference voltage input of digital-to-analog converter 110 was connected in a successful prototype to a voltage source of −10.24 volts, in order that the resolution of the digital peak store should be 10 millivolts. The reset input of binary counter 109 is connected to an external reset terminal.

The output signal terminals of digital-to-analog converter 110 are connected to the inputs of an operational amplifier 111, which has its non-inverting input connected to ground, the output of amplifier 111 being connected to its inverting input through a small capacitor 112.

The output of amplifier 111 is also connected to the inverting input of comparator 105 through resistor 113.

The output of OR gate 94 is connected to the reset input of binary counter 109A. The outputs of operational amplifiers 111 and 111A are connected through corresponding resistors 114 and 115 to the non-inverting and inverting inputs respectively of operational amplifier 116, the non-inverting input being bypassed to ground through resistor 117, and the inverting input being connected to the output through resistor 118. Resistors 114 and 118 can be 20 kohms each, and resistors 115 and 117 can be 10 kohms each. The output of amplifier 111 is connected to the $\sigma_{1PK}$ input of comparator 89 through resistor 90A.

In operation, the maximum principal stress signal is applied on lead $\sigma_1$ to operational amplifier 80, and the peak value is stored as charge in capacitor 82, the peak voltage accumulated being representative of the peak maximum principal stress encountered. Capacitor 82 can be discharged by operating switch 86, which discharges the capacitor through resistor 85. Switch 86 can be an analog switch such as CD4066, having an external reset, from a main external reset terminal.

The peak maximum shear stress signal is also stored in capacitor 101 in a similar manner, which capacitor can be discharged through switch 103.

The peak maximum principal stress voltage stored by capacitor 82 is buffered by operational amplifier 84 and is applied through comparator 105 to one input of AND gate 108, a signal received from an oscillator being applied to the second input of AND gate 108.

Assuming there has been no prior signal stored on capacitor 82, as capacitor 82 charges, storing a signal which is applied to one input of comparator 105. If the value stored by the binary counter is less than the capacitor signal, the output of comparator 105 will go high and effectively turn on AND gate 108. Consequently with each positive pulse from the oscillator, the value stored by binary counter 109 will be incremented. The output signal is converted to analog in digital-to-analog converter 110 and appears at the output of amplifier 111. This signal can be applied to a digital readout, a data logger, or the like, and is representative of a continuous readout of the peak maximum principal stress so far encountered.

However the peak maximum principal stress signal is also applied back to the inverting input of comparator 105. Consequently if the signal applied to its non-inverting input is no greater than the digitally stored peak maximum principal stress signal applied to its inverting input, the output signal from comparator 105 will stay low. Consequently, the oscillator signal applied to AND gate 108 will be blocked resulting in no increment of binary counter 109.

However, as soon as there is a signal applied to the non-inverting input of comparator 105 which is greater than the previously digitally stored peak maximum principal stress signal, it exceeds the signal applied to the inverting input, and a high (logical "true") signal is applied to AND gate 108. Consequently the oscillator pulses pass through AND gate 108, the number of pulses being counted in digital peak store 109. The digital count is converted to analog in digital-to-analog converter 110, and the resulting higher output signal is applied to the inverting input of comparator 105. As soon as this signal matches or is slightly greater than the signal applied to its non-inverting input, the output pulses from AND gate 108 cease, and the increasing count in binary counter 109 ceases. Clearly binary counter 109 is usefully embodied as a digital peak store.

The circuitry involving amplifiers 97, 104, 105B, AND gate 108B, binary counter 109B and digital-to-analog converter 110B operates similarly to that noted above. The output signal of amplifier 111B is representative of the peak maximum shear stress.

The minimum principal stress at the time of the peak maximum principal stress is derived as follows. The peak maximum principal stress signal at the output of operational amplifier 111 is applied to the inverting input of comparator 89. The maximum principal stress signal $\sigma_1$ is applied to its non-inverting input. Consequently only when the maximum principal stress signal exceeds the digitally stored peak maximum stress signal is there a high output from comparator 89. This output is applied to one input of AND gate 93.

Similarly, the output of buffer 84 is connected to the inverting input of comparator 87 and the output of operational amplifier 80 is connected to the non-inverting input of comparator 87. When the maximum principal stress signal at any particular instant exceeds the value as stored in capacitor 82, a positive-going output signal from comparator 87 appears, which is applied to the second input of AND gate 93. The output of AND gate 93 passes through OR gate 94, instructs sample and hold circuit 95 to sample the current value of $\tau_{max}$ and store it in capacitor 96 and resets binary counter 109A.

The output signal from sample and hold circuit 95 is applied to comparator 105A in a manner similar to the signal applied to comparator 105. Thus digital peak store 109A is reset at the time that there is a new peak maximum stress signal, and at that instant the amplitude of the maximum principal stress signal which exceeds the preceding peak maximum principal stress signal causes the current maximum shear stress signal to be stored by sample and hold circuit 95. Since binary counter 109A has previously been reset, the output of operational amplifier 111A goes to zero, and the output level from sample and hold circuit 95 causes comparator 105A output to go high and allow AND gate 108A to pass a series of pulses generated by the oscillator. As binary counter 109A counts the pulses, the output of digital to analog converter 110A rises, causing an output signal from operational amplifier 111A to increase the voltage applied to the inverting input of comparator 105A. When this voltage rises to equal to that which is applied to the non-inverting input of differential amplifier 105A, its output signal goes to zero inhibiting the passage of oscillator pulses through AND gate 108A. Thus no further pulses may be counted by binary counter 109A.

The output signal from operational amplifier 111A is multiplied by two and subtracted from the signal at the output of operational amplifier 111 in operational amplifier 116, to provide at its output a signal which is the minimum principal stress signal at the instant of the peak maximum principal stress. This signal, as well as the other two derived signals, the peak maximum stress signal at the output of amplifier 111 and the peak maximum shear stress signal at the output of amplifier 111B can be applied to separate digital panel meters, recorded by a data logger, etc.

While the above has described a single channel, a plurality of parallel channels may be used, the outputs from the last-noted amplifiers being selectable and connectable to individual digital panel meters by switches.

In a multichannel system, a sine wave oscillator clock connected to the AND gates is preferred, in order to reduce spurious noise in the analog circuitry. However in a single channel system a CMOS square wave oscillator (e.g. type CD4047) is preferred.

The above-described invention has been found to be an extremely useful tool for the structural analyst, since real time determination of the stress factors has not been previously available to him. As a result, significant increase in accuracy of design and saving of time with attendant cost reduction in the design of such structures as military vehicles can now be realized.

A person skilled in the art understanding this invention may now conceive of variations or other embodiments thereof. All are considered to be within the sphere and scope of the present invention as defined in the claims appended hereto.

The embodiments of the invention in which an exclusive property or privilege is claimed are defined as follows:

1. Apparatus for the determination of stress in a structural member of a known material, comprising:
   a rectangular strain gauge rosette, attached to said member, for providing continuous input signals for the apparatus;
   first analog signal processor means, connected to receive said input signals, for continuously providing three stress signals, namely, a maximum principal stress signal $\sigma_1$ representative of maximum principal stress detected by the rosette, a minimum principal stress signal $\sigma_2$ representative of minimum principal stress detected by the rosette, and a maximum shear stress signal $\tau_{max}$ representative of maximum shear stress detected by the rosette, for each instantaneous input signal upon receipt of said input signals; and
   second signal processor means, connected to receive at least two of said three stress signals, for providing and storing three output signals, namely, a peak maximum principal stress signal $\sigma_{1PK}$ representative of peak maximum principal stress detected by the rosette, a signal $\sigma_{2PK}$ representative of minimum principal stress at the instant of peak maximum principal stress, and a peak maximum shear stress signal $\tau_{max\ PK}$ representative of the peak maximum shear stress detected by the rosette, wherein the second processor means comprises
   a first peak detector, connected to receive the maximum principal stress signal $\sigma_1$, for providing the peak maximum principal stress signal $\sigma_{1PK}$,
   a first memory, connected to receive and store the peak maximum principal stress signal $\sigma_{1PK}$,
   a second peak detector, connected to receive the maximum shear stress signal $\tau_{max}$, for providing the peak maximum shear stress signal $\tau_{max\ PK}$,
   a second memory, connected to receive and store the peak maximum shear stress signal $\tau_{max\ PK}$,
   a logic circuit, connected to receive the maximum principal stress signal $\sigma_1$ and the peak maximum principal stress signal $\sigma_{1PK}$, for providing an output control signal for controlling acquisition of the maximum shear stress signal $\tau_{max}$ at the time of occurrence of a new peak maximum principal stress, a sample and hold circuit, which is connected to receive the maximum shear stress signal $\tau_{max}$ and said control signal, and which is actuated by the control signal to sample and hold the value of the maximum shear stress signal $\tau_{max}$ at the time of occurrence of a new peak maximum principal stress, a third memory, which is connected to receive the control signal and the signal value held by the sample and hold circuit and which is reset by the control signal, for storing the signal value held by the sample and hold circuit, and subtracting means, connected to receive the signal value stored by the third digital peak store and the peak maximum principal stress signal $\sigma_{1PK}$, for doubling said signal value stored by the third digital peak store and subtracting the doubled signal value from the peak maximum principal stress signal $\sigma_{1PK}$, to continuously provide the signal $\sigma_{2PK}$ representative of the minimum principal stress at the instant that the maximum principal stress is peaking.

2. Apparatus as defined in claim 1, in which said input signals include one from each of three arms of said rosette located at successive 45° angles relative to a given principal axis, and in which the first analog signal processor means includes circuit means having three simultaneous analog transfer functions:

$$\sigma_1 = \quad (1)$$

$$E\left[\frac{\epsilon_A + \epsilon_C}{2(1-\nu)} + \frac{1}{2(1+\nu)} \sqrt{(\epsilon_A - \epsilon_C)^2 + (2\epsilon_B - \epsilon_A - \epsilon_C)^2}\right]$$

$$\sigma_2 = \quad (2)$$

$$E\left[\frac{\epsilon_A + \epsilon_C}{2(1-\nu)} - \frac{1}{2(1+\nu)} \sqrt{(\epsilon_A - \epsilon_C)^2 + (2\epsilon_B - \epsilon_A - \epsilon_C)^2}\right]$$

$$\tau_{MAX} = \frac{\sigma_1 - \sigma_2}{2} = \quad (3)$$

$$\frac{E}{2(1-\nu)} \sqrt{(\epsilon_A - \epsilon_C)^2 + (2\epsilon_B - \epsilon_A - \epsilon_C)^2}$$

where $\epsilon_A$ is an input signal from a first strain gauge rosette arm located along the principal axis of an apparatus to be measured, $\epsilon_B$ is an input signal from a second strain gauge rosette arm located at a 45° angle to the first arm, $\epsilon_C$ is an input signal from a third strain gauge rosette arm located at a 90° angle to the first arm, $\nu$ is a first constant of the structural member material, and E is a second constant of the structural member material.

3. Apparatus for the determination of stress in a structural member of a known material, comprising:

a rectangular strain gauge rosette, including a first strain gauge rosette arm located along a principal axis of the structural member to be measured for providing a first input signal $\epsilon_A$, a second strain gauge rosette arm located at a 45° angle to the first arm for providing a second input signal $\epsilon_B$, and a third strain gauge rosette arm located at a 90° angle to the first ram for providing a third input signal $\epsilon_C$;

first analog signal processor means, connected to receive the three input signals $\epsilon_A$, $\epsilon_B$, and $\epsilon_C$, for continuously providing three stress signals, namely, a maximum principal stress signal $\sigma_1$ representative of maximum principal stress detected by the rosette, a minimum principal stress signal $\sigma_2$ representative of minimum principal stress detected by the rosette, and a maximum shear stress signal $\tau_{max}$ representative of maximum shear stress detected by the rosette, for each instantaneous input signal upon receipt of said input signals, the first signal processor means including circuit means having three simultaneous analog transfer functions, $$\sigma_1 = \quad (1)$$

$$E\left[\frac{\epsilon_A + \epsilon_C}{2(1-\nu)} + \frac{1}{2(1+\nu)} \sqrt{(\epsilon_A - \epsilon_C)^2 + (2\epsilon_B - \epsilon_A - \epsilon_C)^2}\right]$$

$$\sigma_2 = \quad (2)$$

$$E\left[\frac{\epsilon_A + \epsilon_C}{2(1-\nu)} - \frac{1}{2(1+\nu)} \sqrt{(\epsilon_A - \epsilon_C)^2 + (2\epsilon_B - \epsilon_A - \epsilon_C)^2}\right]$$

$$\tau_{MAX} = \frac{\sigma_1 - \sigma_2}{2} = \quad (3)$$

$$\frac{E}{2(1-\nu)} \sqrt{(\epsilon_A - \epsilon_C)^2 + (2\epsilon_B - \epsilon_A - \epsilon_C)^2}$$

where $\nu$ and E are first and second constants, respectively, of the structural member material; and second signal processor means for providing and storing three output signals, namely, a peak maximum principal stress signal $\sigma_{1PK}$ representative of peak maximum principal stress detected by the rosette, a signal $\sigma_{2PK}$ representative of minimum principal stress at the instant of peak maximum principal stress, and a peak maximum shear stress signal $\tau_{max\ PK}$ representative of peak maximum shear stress detected by the rosette, in which the second signal processor means comprises first signal storing means for storing the peak voltage amplitude of the maximum principal stress signal $\sigma_1$, a first comparator having an output, a first input connected to receive said peak voltage amplitude stored by the first signal storing means, and a second input;

a first AND gate having an output, a first input connected to receive the output signal of the first comparator, and a second input connected to receive a clock signal, a first counter, having an output and having an input connected to the output of the first AND gate;

a first digital-to-analog converter having an input connected to the output of the first counter, for continuously providing the peak maximum principal stress signal $\sigma_{1PK}$, the second input of the first comparator being connected to receive the peak principal stress signal $\sigma_{1PK}$ provided by the first digital-to-analog converter, whereby the first AND gate passes clock pulses which are counted the first counter whenever the peak voltage amplitude applied to the first input of the first comparator exceeds the peak maximum principal stress signal $\sigma_{1PK}$ applied to the second input of the first comparator, a second comparator having an output, a first input connected to receive the peak voltage amplitude stored by the first signal storing means, and a second input connected to receive the maximum principal stress signal $\sigma_1$, for generating an output signal of a predetermined polarity whenever the maximum stress principal stress signal $\sigma_1$ exceeds the stored peak voltage amplitude, a third comparator having an output, a first input connected to receive the peak maximum principal stress signal $\sigma_{1PK}$, and a second input connected to receive the maximum principal stress signal $\sigma_1$, for generating an output signal of said predetermined polarity when the maximum stress principal stress signal $\sigma_1$ exceeds the peak maximum principal stress signal $\sigma_{1PK}$, a second AND gate having an output, a first input connected to the output of the second comparator, and a second input connected to the output of the third comparator, a sample and hold circuit, having an output, a first input connected to receive the maximum shear stress signal $\tau_{max}$, and a second input connected to the output of the second AND gate, for sampling and holding the peak voltage value of the maximum shear stress signal $\tau_{max}$ at the time of occurrence of a new peak maximum principal stress, a fourth comparator having an output, a first input connected to the output of the sample and hold circuit, and a second input, a third AND gate having an output, a first input connected to the output of the fourth comparator, and a second input connected to receive the clock signal, a second counter having an output and having an input connected to the output of the third AND gate, a second digital-to-analog converter, connected to the output of the second counter, for providing a second counter output signal, the second input of the fourth comparator being connected to receive the second counter output signal, and subtractor means, connected to receive the second counter output signal and the peak maximum principal stress signal $\sigma_{1PK}$, for doubling the second counter output signal and subtracting the doubled second counter output signal from the peak maximum principal stress signal $\sigma_{1PK}$, to continuously provide the signal $\sigma_{2PK}$ representative of the minimum principal stress at the instant of peak maximum principal stress.

4. Apparatus as defined in claim 3 in which the first analog signal processor means comprises:

first operational amplifier means, connected to receive the signals $\epsilon_A$ and $\epsilon_C$, for adding the signals $\epsilon_A$ and $\epsilon_C$ to provide an output signal A;

second operational amplifier means, connected to receive the signals $\epsilon_A$ and $\epsilon_C$, for subtracting the signal $\epsilon_C$ from the signal $\epsilon_A$ to provide an output signal B;

third operational amplifier means, connected to receive the signals $\epsilon_A$, $\epsilon_B$, and $\epsilon_C$, for multiplying the signal $\epsilon_B$ by 2 and subtracting the signals $\epsilon_A$ and $\epsilon_C$ from the multiplied signal $2\epsilon_B$, to provide an output signal C;

rectifying means for full wave rectifying the signals B and C to provide signal $|B|$ and $|C|$ respectively;

converter means, connected to receive the signals $|B|$ and $|C|$, for generating a signal D formed of the square root of the sum of the squares of the signals $|B|$ and $|C|$, said signal D constituting the maximum shear stress signal $\tau_{max}$;

fourth operational amplifier means, connected to receive the signals A and D, for adding the signals A and D to provide the maximum principal stress signal $\sigma_1$; and fifth operational amplifier means, connected to receive the signals A and D, for subtracting the signal D from the signal A to provide the minimum principal stress signal $\sigma_2$.

5. Apparatus as defined in claim 3, in which the second signal processor means further comprises:

second signal storing means for storing the peak voltage amplitude of the maximum shear stress signal $\tau_{max}$;

a fifth comparator having an output, a first input connected to receive said peak voltage amplitude stored by the second signal storing means, and a second input;

a fourth AND gate having an output, a first input connected to receive the output signals of the fifth comparator, and a second input connected to receive the clock signal;

a third counter, having an output and having an input connected to the output of the fourth AND gate; and a third digital-to-analog converter having an input connected to the output of the third counter, for continuously providing the peak maximum shear stress signal $\tau_{max\ PK}$, the second input of the fifth comparator being connected to receive the peak maximum shear stress signal $\tau_{max\ PK}$ provided by the third digital-to-analog converter, whereby the fourth AND gate passes clock pulses which are counted by the third counter wherever the peak voltage amplitude applied to the first input of the fifth comparator exceeds the peak maximum shear stress signal $\tau_{max\ PK}$ applied to the second input of the fifth comparator.

6. Apparatus as defined in claim 3, in which the structural member material is steel, whereby the first constant $\nu$ is approximately 0.3 and the second constant E is approximately $3 \times 10^7$.

7. Apparatus for the determination of stress in a structural member of a know material, comprising:

a rectangular strain gauge rosette, attached to said member, for providing continuous input signals for the apparatus;

first analog signal processor means, connected to receive said input signals, for continuously providing three stress signals, namely, a maximum principal stress signal $\sigma_1$ representative of maximum principal stress detected by the rosette, a minimum principal stress signal $\sigma_2$ representative of minimum principal stress detected by the rosette, and a maximum shear stress signal $\tau_{max}$ representative of maximum shear stress detected by the rosette, for each instantaneous input signal upon receipt of said input signals; and second signal processor means, connected to receive at least two of said three stress signals, for providing and storing three output signals, namely, a peak maximum principal stress signal $\sigma_{1PK}$ representative of peak maximum principal stress detected by the rosette, a signal $\sigma_{2PK}$ representative of minimum principal stress at the instant of peak maximum principal stress, and a peak maximum shear stress signal $\tau_{max\ PK}$ representative of the peak maximum shear stress detected by the rosette, wherein the second processor means comprises a first analog peak detector, connected to receive the maximum principal stress signal $\sigma_1$, for providing the peak maximum principal stress signal $\sigma_{1PK}$, a first digital peak store connected to receive and store the peak maximum principal stress signal $\sigma_{1PK}$, a second analog peak detector, connected to receive the maximum shear stress signal $\tau_{max}$, for providing the peak maximum shear stress signal $\tau_{max\ PK}$, a second digital peak store, connected to receive and store the peak maximum shear stress signal $\tau_{max\ PK}$, a logic circuit, connected to receive the maximum principal stress signal $\sigma_1$ and the peak maximum principal stress signal $\sigma_{1PK}$, for providing an output control signal for controlling acquisition of the maximum shear stress signal $\tau_{max}$ at the time of occurrence of a new peak maximum principal stress, a sample and hold circuit, which is connected to receive the maximum shear stress signal $\tau_{max}$ and said control signal, and which is actuated by the control signal to sample and hold the value of the maximum shear stress signal $\tau_{max}$ at the time of occurrence of a new peak maximum principal stress, a third digital peak store, which is connected to receive the control signal and the signal value held by the sample and hold circuit and which is reset by the control signal, for storing the signal value held by the sample and hold circuit, and subtracting means, connected to receive the signal value stored by the third digital peak store and the peak maximum principal stress signal $\sigma_{1PK}$, for doubling said signal value stored by the third digital peak store and subtracting the doubled signal value from the peak maximum principal stress signal $\sigma_{1PK}$, to continuously provide the signal $\sigma_{2PK}$ representative of the minimum principal stress at the instant that the maximum principal stress is peaking.

* * * * *